US006553461B1

(12) United States Patent
Gupta et al.

(10) Patent No.: US 6,553,461 B1
(45) Date of Patent: Apr. 22, 2003

(54) CLIENT CONTROLLED PRE-FETCHING OF RESOURCES

(75) Inventors: Amit Gupta, Fremont, CA (US); Geoffrey Baehr, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/459,320

(22) Filed: Dec. 10, 1999

(51) Int. Cl.[7] .............................................. G06F 12/00
(52) U.S. Cl. ..................... 711/137; 711/118; 711/213
(58) Field of Search ............................... 711/118, 137, 711/213, 216, 217, 3, 138; 712/207, 237

(56) References Cited

U.S. PATENT DOCUMENTS

| | | | | |
|---|---|---|---|---|
| 5,802,292 A | * | 9/1998 | Mogul ................... | 395/200.33 |
| 6,073,168 A | * | 6/2000 | Mighdoll et al. ............. | 707/10 |
| 6,085,193 A | * | 7/2000 | Malkin et al. ................. | 707/10 |
| 6,085,226 A | * | 7/2000 | Horvitz ....................... | 709/203 |
| 6,128,623 A | * | 10/2000 | Mattis et al. ................. | 707/100 |
| 6,144,996 A | * | 11/2000 | Starnes et al. ............... | 709/217 |
| 6,182,133 B1 | * | 1/2001 | Horvitz .......................... | 707/8 |
| 6,311,260 B1 | * | 10/2001 | Stone et al. ................. | 711/137 |
| 6,385,641 B1 | * | 5/2002 | Jiang et al. .................. | 709/203 |

OTHER PUBLICATIONS

Wang et al., "Prefetching in World Wide Web" IEEE, pp. 28–32, 1996.*
Jiang et al., "An Adaptive Network Prefetch Scheme," IEEE, pp. 358–368, Apr. 1998.*
Jiang et al., "Web Prefetching in a Mobile Environment," IEEE, pp. 25–34, Oct. 1998.*
Cao, P. Application–controlled file caching and prefetching (Thesis) Technical Report: TR–522–96 (1996), Abstract & Thesis http://ncstrl.cs.princeton.edu/dienst/ui/2.0/describe/ncstrl.princeton
2ftr–522–96.
Cohen, E. et al., "Efficient algorithms for predicting requests to web servers," Infocom (1999).
Crovella, M. et al., "The network of prefetching," Boston University Computer Science Department, Technical Report TR–92–002 pp. 1–22 (1997).
Jiang Z. et al., "Prefetching links on the WWW," ICC Montreal, Canada pp. 483–489 (1997).
Jouppi, N. P. "Improving direct–mapped cache performance by the addition of a small fully–associative cache and prefetch buffers," WRL Technical Note TN–14 (1990).
Padmanabhan, V. N. et al., "Using predictive prefetching to improve world wide web latency," ACM Sigcomm Computer Communication Review, (1996).

* cited by examiner

*Primary Examiner*—Matthew Kim
*Assistant Examiner*—Stephen Elmore
(74) *Attorney, Agent, or Firm*—Lahive & Cockfield, LLP (57) ABSTRACT

A client is given control over the pre-fetching of resources. The client may be, for example, resident on an electronic device such as a computer system that caches resources. The resources may be, for instance, web pages. Identifying property values that are intrinsically tied to the contents of the resources are used to determine whether resources are already resident within the cache prior to pre-fetching the resources. In addition, the client may request information regarding a resource to assist the client in determining whether to pre-fetch the resource. Such information may include the size of the resource and other information.

32 Claims, 7 Drawing Sheets

CLIENT CONTROLLED PRE-FETCHING OF RESOURCES

TECHNICAL FIELD

The present invention relates generally to computer systems and more particularly to client controlled pre-fetching of resources in computer systems.

BACKGROUND OF THE INVENTION

In conventional systems, users must often wait a significant period of time between when the users request web pages from web servers and when the users receive the web pages. As a result, some conventional systems have begun to employ caches. Each cache holds selected web pages and is able to return the selected web pages to the users more quickly than the web servers that hold the web pages. When a user wishes to obtain a copy of a selected web page, a cache is checked to determine whether a web page with a matching uniform resource locator (URL) is resident within the cache. If no matching web page is resident within the cache, a request is sent to a remote web server to obtain a copy of the web page.

The resulting increase in performance due to the use of caching is largely dependent upon what web pages are cached. Numerous conventional approaches have been devised for "pre-fetching" web pages in anticipation that the user will next request the web pages that are pre-fetched. For example, in some conventional systems, when a web page is retrieved from a web server, all of the web pages referenced by hyperlinks within the retrieved web page are pre-fetched for storage within the cache. Other conventional systems pre-fetch web pages resident on the same web site as the web page that was most recently retrieved.

Unfortunately, the pre-fetching strategies of conventional systems have not predicted user activity well. In other words, with such strategies, web pages have been pre-fetched that are not of interest to the user. This results in unnecessary overhead, the waste of precious cache space and unnecessary traffic and congestion. This problem is especially magnified when a significant number of web pages or very large web pages are pre-fetched. An additional problem with conventional systems is that web pages may be pre-fetched that are already resident within the cache. Still further, web pages of small size may be pre-fetched; hence, the caching results in only a minimum overhead savings or even an overhead loss.

SUMMARY OF THE INVENTION

The present invention addresses the above-described limitations of conventional systems. In particular, the present invention provides client controlled pre-fetching of identifying function values for resources and/or resources for a cache. The resources may be, for example, web pages, audio content, video content, data files or even computer programs. The client may control pre-fetching based upon a number of different criteria. For example, an identifying property value may be examined for a desired resource to determine whether a copy of the resource is already resident within the cache. The identifying property value is intrinsically tied to the contents of the resource so that resources with different names, addresses or URLs may be compared to determine if they have the same content. Information regarding the size of a resource may be obtained prior to pre-fetching the resource to determine whether the resource is of sufficient size to result in a significant enough savings to warrant pre-fetching. Other criteria, such as statistical information, historical information, state of the network and the like, may be used as part of the decision to determine whether to pre-fetch a resource or not.

In accordance with one aspect of the present invention, a selected identifying property value for a selected resource is obtained in an electronic device, such as a computer system, that has a cache for caching resources. The selected identifying property value is compared with identifying property values for the resources in the cache to determine whether the selected resource is resident within the cache. Where the selected resource is not resident within the cache, the selected resource is pre-fetched to obtain and store a copy of the selected resource in the cache. In the case where the selected resource is determined to be resident in the cache, the pre-fetching of the selected resource may be prevented. The resource may be a web page, for example. The identifying property value may be a hash function value that is calculated by applying a hash function to the respective resources. This method may be performed by a proxy or a web browser.

In accordance with another aspect of the present invention, information regarding a selected resource is requested by a device that has a cache for caching resources. An identifying property value for the selected resource and information regarding the size of the selected resource are received in response to the request. Where the size of the selected resource fails to exceed a threshold, the selected resource is not pre-fetched. Where the selected resource exceeds the threshold, the identifying property value may be used to determine whether the selected resource is already resident within the cache. If the selected resource is already resident in the cache, pre-fetching of the selected resource is prevented. In contrast, where it is determined that the selected resource is not already resident in the cache, the pre-fetching of the selected resource may be initiated.

In accordance with an additional aspect of the present invention, a method is practiced in a device that has a cache for caching resources. In accordance with this method, a selected value is obtained for a selected resource. The selected value is intrinsically tied to the contents of the resource so as to identify the resource. Based on the selected value, it is determined whether the selected resource is already resident in the cache. If it is determined that the selected resource is not already resident in the cache, a check is made whether an additional criteria is met. If the additional criteria is met and it is determined that the selected resource is not already resident in the cache, the selected resource is pre-fetched. The additional criteria may be that the resource is of a size that is large enough to warrant pre-fetching.

BRIEF DESCRIPTION OF THE DRAWINGS

An illustrative embodiment, consistent with the principles of the present invention, will be described in more detail below relative to the following drawings.

DETAILED DESCRIPTION OF THE INVENTION

The illustrative embodiment, which is consistent with the principles of the present invention, provides a mechanism wherein a device may control whether and what resources are pre-fetched for storage within a cache. The device may obtain information from the source of the resource (e.g. a web server) to help provide guidance as to whether to pre-fetch the resource. For example, information regarding the contents of the resource may be obtained so that the requesting device may determine whether a copy of the resource is already cached prior to pre-fetching the resource. Similarly, size information regarding the size of the resource may be obtained to determine whether the resource is of sufficient size as to warrant pre-fetching. The requesting device may also examine other information, such as statistical information, historical information, the current state of the relevant network and other information, to determine whether pre-fetching of the resource is warranted.

The resources that are to be pre-fetched may take many different forms. For instance, the resources may include web pages, markup language document pages such as hypertext mark-up language (HTML) pages, or extensible mark-up language (XML) pages, or other types of pages. In addition, the resources may be data files, audio content, video content or even executable content, such as computer programs or scripts.

The illustrative embodiment employs identifying property values. Each resource has an associated identifying property value that is intrinsically tied to the content of the resource. If the content of the resource changes, the identifying property value is very likely to change. One suitable identifying property value for practicing the illustrative embodiment is a hash function value that is calculated by applying a hash function to at least the portion of the contents of the resource. A suitable hash function is the MD5 hash function developed by Ron Rivest. Those skilled in the art will appreciate that other hash functions may be utilized in practicing the present invention. For example, the MD2, MD4, Secure Hash Algorithm (SHA), SNERFU, HAVAL or RIPE-MD hash functions may be utilized in practicing the present invention. The hash function does not need to be a "strong" hash function. Moreover, identifying property values are not limited to hash functions but may be checksums or other functions that are intrinsically tied to the contents of the resources.

For purposes of the discussion below, it is helpful to define a few terms. A "document" is a self-contained referenceable grouping of information. The term "document" is intended to encompass but is not limited to word processing documents, web pages, images, audio files, and other varieties of textual files.

A "web page" is a page of a document or a file that may be displayed by a web browser as a single page. Examples of a "web page" include a hypertext markup language (HTML) file, an extensible markup language file (XML) file or other encoding format suitable for encoding a web page. A web page is a page containing content in a format that is renderable by a web browser.

"Content" refers to any information or data that may be incorporated into a destination by a data sink.

A "resource" refers to a web page, program, data file or other entity that may be used or consumed by a client.

"Pre-fetching" is the retrieving of a resource for caching prior to an explicit request by a client to obtain the resource.

Figure 1:
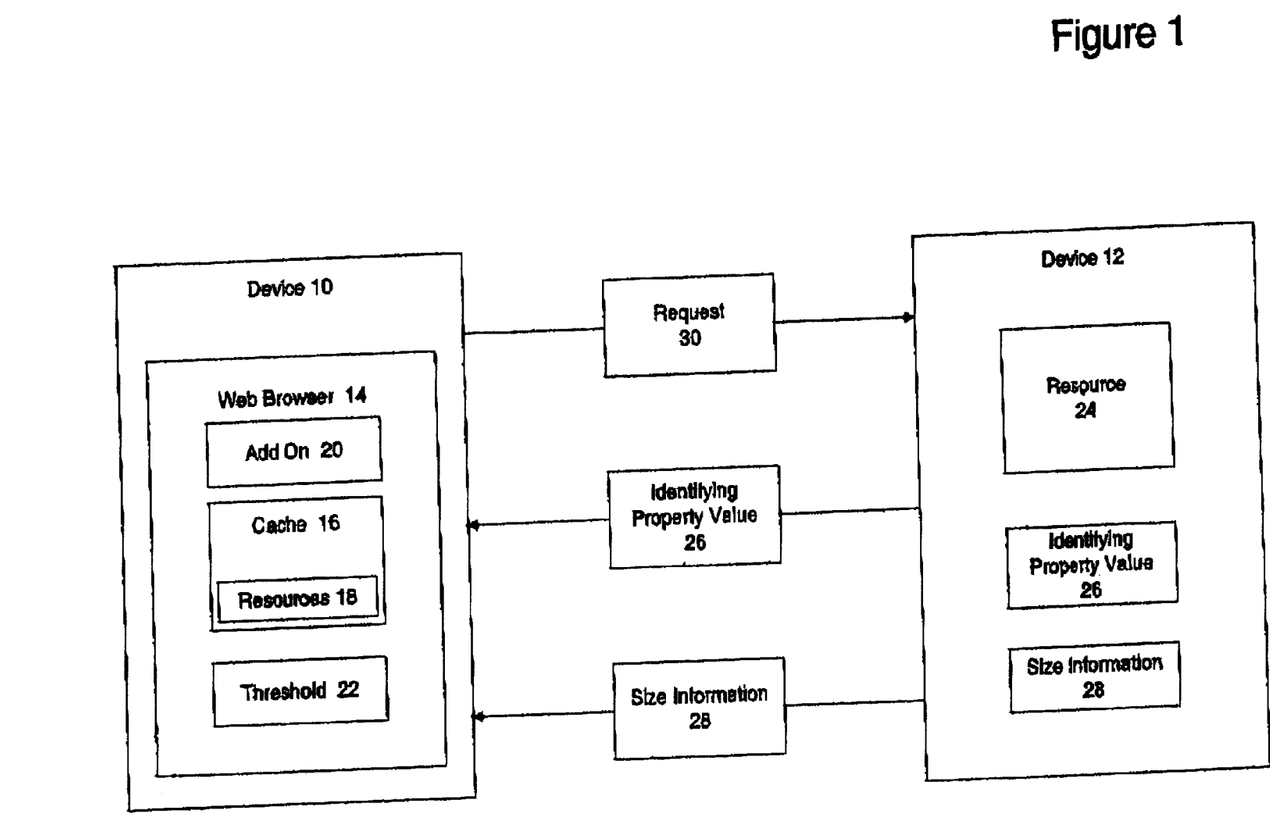
FIG. 1 is a block diagram that illustrates the communications between a first device and a second device to pass information regarding a resource prior to pre-fetching the resource.

FIG. 1 depicts an environment suitable for practicing the illustrative embodiment. In this environment, device 10 communicates with device 12. Device includes a web browser 14 for enabling a user of the device 10 to browse the Internet, an intranet, an extranet or the like. The web browser 14 may be, for example, the Netscape Navigator™ web browser or the Netscape Communicator™ web browser. Those skilled in the art will appreciate that other web browsers 14 may be used to practice the present invention. More generally, the present invention may be practiced with any program (not just a web browser) that is able to view or utilize resources that are to be obtained from a second device and cached.

The web browser 14 includes a cache 16 for caching resources 18. The web browser 14 includes an add-on 20 that provides the added functionality necessary for practicing the illustrative embodiment. Threshold information 22 may also be stored on the device 10. The add-on 20, the web browser 14 and the threshold information 22 are stored in a storage medium. The storage may include both primary memory and secondary memory.

Device 12 holds a copy of a resource 24 and may also hold additional resources. An identifying property value 26 for the resource 24 is stored on the device 12. Alternatively, the identifying property value may be calculated on the fly by the device 12 when needed. Size information 28 is also stored on the device 12 for the resource 24. Those skilled in the art will appreciate that the size information 28 may be directly integrated into the resource 24 in some instances rather than being stored as a separate piece of data.

Devices 10 and 12 may take many different forms. For example, the devices 10 and 12 may be computer systems, such as personal computer systems, workstations, network computers, laptop computers, personal digital assistants or other varieties of computer systems. More generally, devices 10 and 12 may be any electronic devices that are capable of communicating to exchange resources that are to be cached. As such, devices 10 and 12 may be intelligent appliances (i.e. electronic devices suitable for household use that have intelligence for communicating with other devices), printers, facsimile machines, settop boxes for televisions or even two-way pagers. Those skilled in the art will appreciate that the listed varieties of electronic devices is intended to be merely illustrative and not exhaustive.

The discussion will now focus on activities performed by device 10 in practicing the present invention. Before device 10 pre-fetches resource 24 from device 12, device submits a request 30 for information regarding the resource (step 40 in FIG. 3). An identifying property value 26 for the resource 24 and size information 28 regarding the resource are received by the device 10 after the request has been fulfilled (step 42 in FIG. 3). As mentioned above, the identifying property value 26 for the resource 24 may be, for example, a hash function value that is calculated by passing the contents of the resource through a hash function. Thus, the identifying property value may be "pre-fetched." The identifying property value 26 is used to determine whether a copy of the resource 24 is already resident within the cache 16 on device 10. Specifically, device 10 compares the identifying property value 26 for the resource 24 with identifying property values for the resources 18 resident within the cache to see if there are any matches (step 44 in FIG. 3). The identifying property values for the resources 18 may be stored on device 10 or may be calculated on the fly. The resources 18 may be indexed by the identifying property values so as to make a quick determination of whether there is a match or not. A match implies that a copy of the resource is already resident within the cache. If such a match is found, the resource is not pre-fetched (step 46 in FIG. 3). In contrast, if there is not matching identifying property value, it is indication that a copy of the resource is not already resident within the cache 16.

Figure 2:
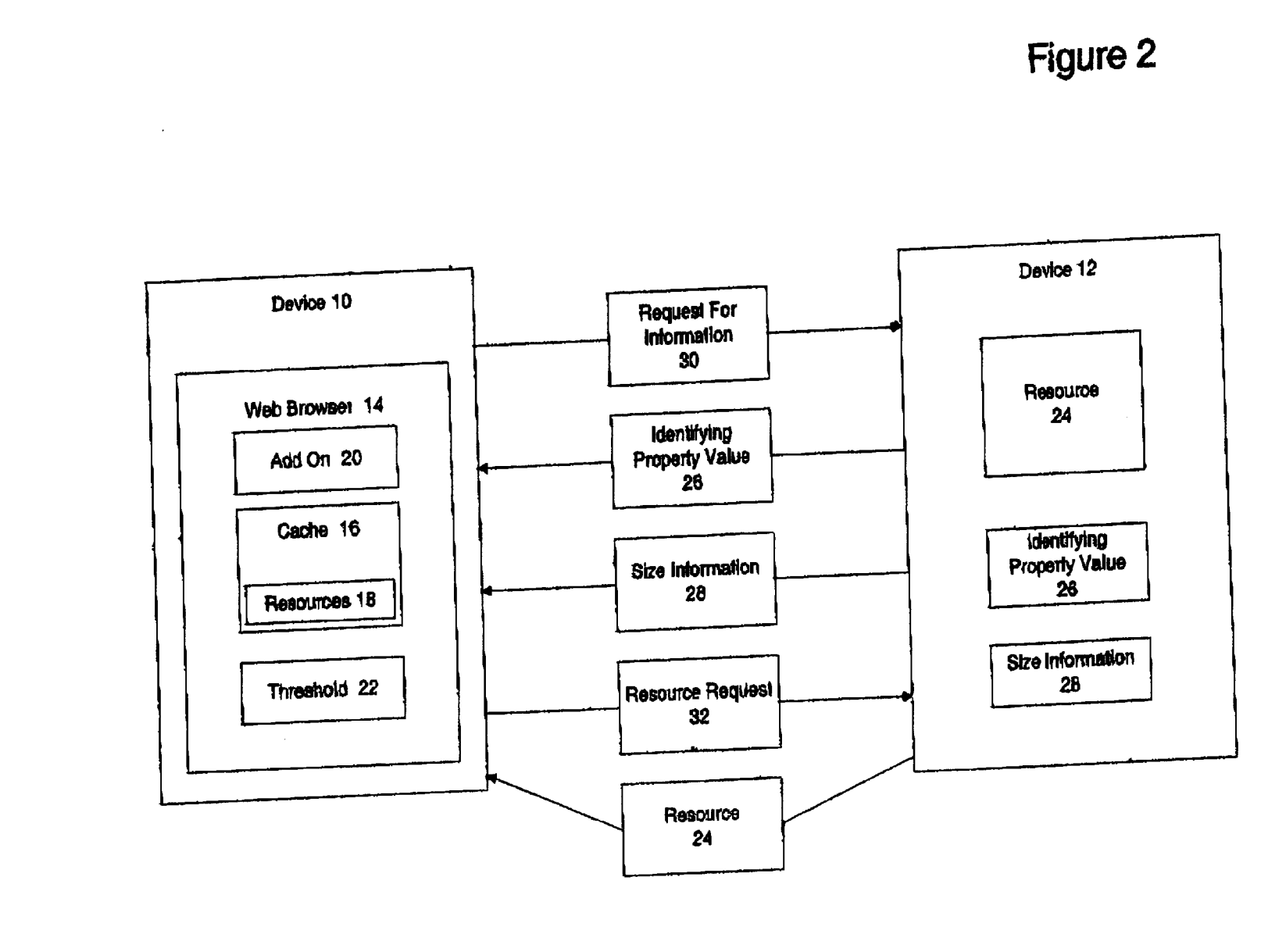
FIG. 2 is a block diagram illustrating the communications between a first device and second device in which information regarding a resource is obtained and the resource is pre fetched.
Figure 3:
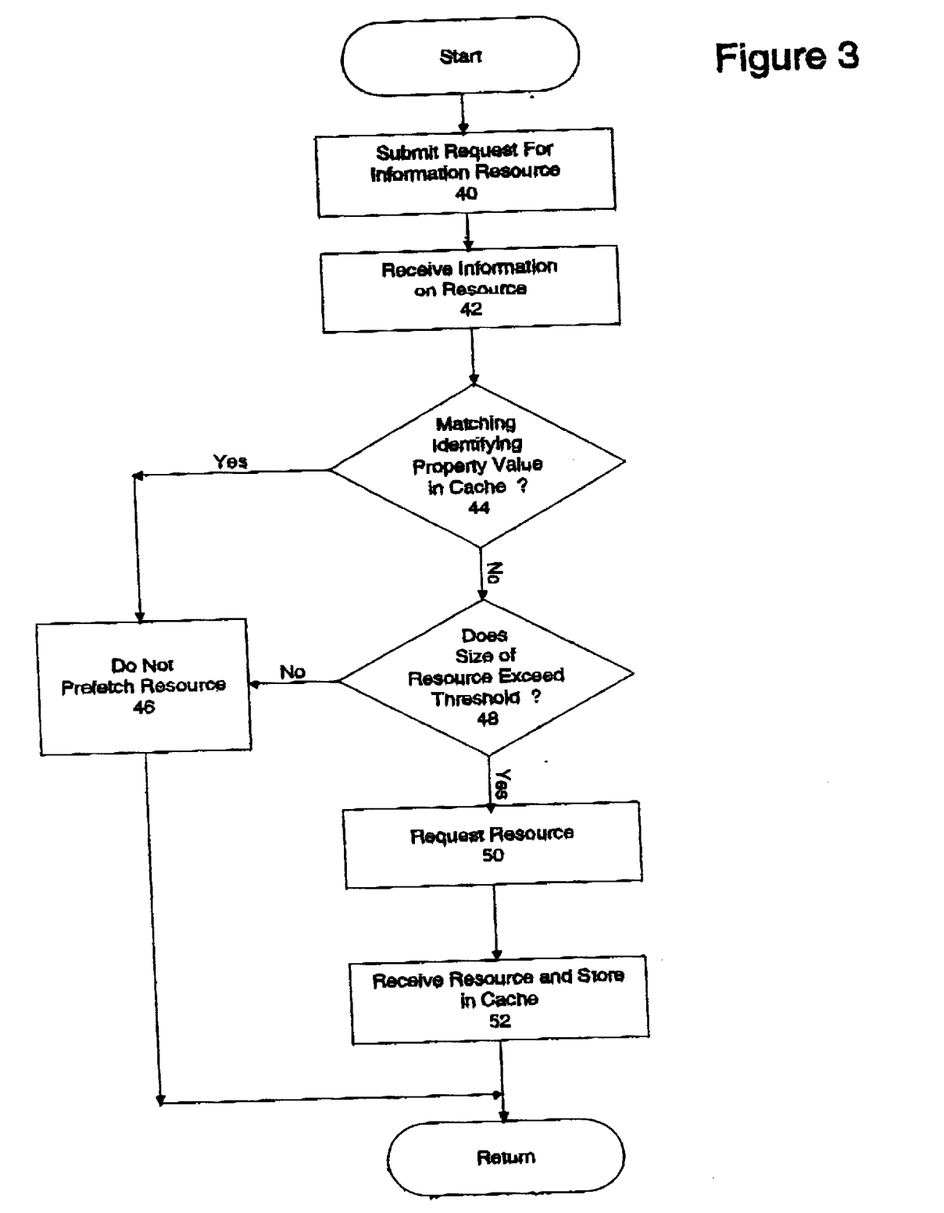
FIG. 3 is a flow chart illustrating the steps that are performed by a device in determining whether to pre-fetch a resource based on whether the resource is already cached and whether the resource is of sufficient size to warrant pre-fetching.

In the case where a copy of the resource is not already resident in the cache, device 10 may make an additional check to determine whether it is desirable to pre-fetch the resource or not. In particular, device 10 may determine whether the resource 24 is of sufficient size to warrant pre-fetching. The size information 28 that is received by device 10 is compared to the threshold 22 to determine whether the size of the resource exceeds the threshold (step 48 in FIG. 3). If the size of the resource is less than or equal to the threshold, there is no need to pre-fetch the resource because the pre-fetching would result in only minimal latency savings and would cost computational and memory overhead. Those skilled in the art will appreciate that the comparison to the threshold need not look purely to see whether the size of the resource exceeds the threshold. There may be instances wherein if the size of the resource is equal to the threshold, the resource is still pre-fetched. Moreover, the size of the resource and the threshold need not be calculated on a positive scale where a greater than determination is made. Instead a negative scale may be used where a less than comparison results in pre-fetching of the resource. More generally, the determination is based upon the magnitude of the resource and whether, based on the magnitude of the resource, it is desirable to pre-fetch the resource or not. Other criteria may also be taken into account in deciding whether to pre-fetch the resource. For example, available network bandwidth, cache space available and other factors may be considered in deciding whether to pre-fetch the resource.

Where it is determined that it is desirable to pre-fetch the resource, device 10 submits a resource request as shown in FIG. 2 (step 50 in FIG. 3). Device 10 receives the resource 24 and stores the resource within the cache 16 (step 52 in FIG. 3).

Figure 4:
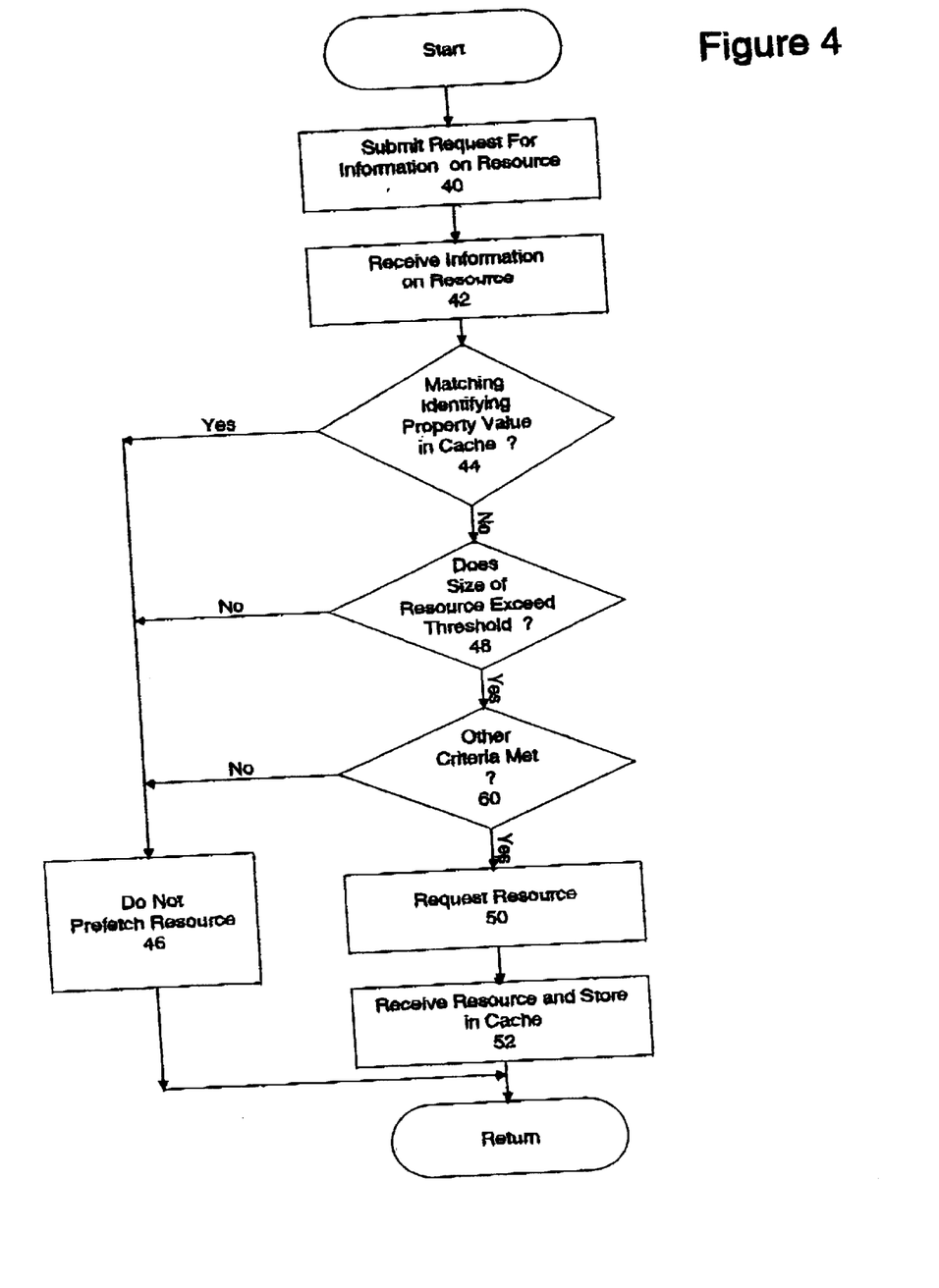
FIG. 4 is a flow chart illustrating the steps that are performed by a device in which multiple criteria are applied to determine whether to pre-fetch a resource.

Those skilled in the art will appreciate that additional criteria may also be applied in determining whether to pre-fetch the resource 24. FIG. 4 shows a flow chart of such a case. The steps 40, 42, 44, 46, 48, 50 and 52 are identical to those described above relative to FIG. 3. The flow chart of FIG. 4 differs in that when it is determined that the size of the resource exceeds the threshold in step 48, a check is made whether other criteria are met (step 60 in FIG. 4). As mentioned above, additional criteria may be employed in determining whether to pre-fetch the resource. The other criteria may relate to the state of the network that facilitates communication between device 10 and 12, whether the resource has been successfully pre-fetched in the past and whether other certain statistical criteria are met. Those skilled in the art will appreciate that a number of different types of criteria may be employed. If such other criteria are not met, the resource is not pre-fetched (step 46 in FIG. 4). Otherwise the resource is pre-fetched by performing steps 50 and 52, which have been described above relative to FIG. 3.

The above discussion has focused on activities performed by device 10. The discussion below focuses on activities performed by device 12.

Figure 5:
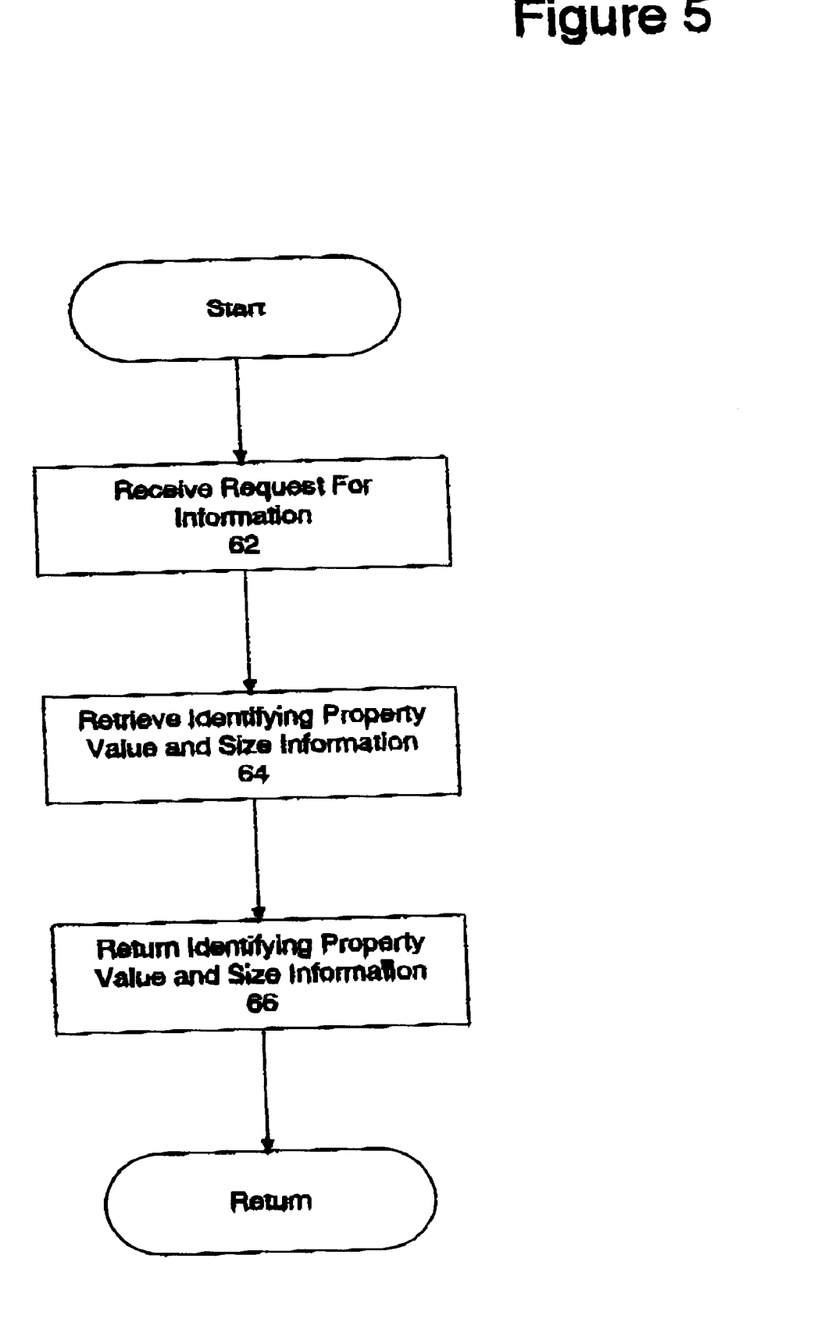
FIG. 5 is a flow chart illustrating the steps that are performed by a device holding a copy of a resource to provide a requester with information regarding the resource to guide pre-fetching decisions.

FIG. 5 is a flow chart that illustrates the steps that are performed by device 12 in providing information to device 10 to guide the decision whether to pre-fetch a resource. Initially the request 30 for information is received by device 12 from device (step 62 in FIG. 5). The device 12 retrieves the identifying property value 26 and the size information 28 (step 64 in FIG. 5). As was described above, the identifying property value 26 and the size information 28 are returned by device 12 to device 10.

Figure 6:
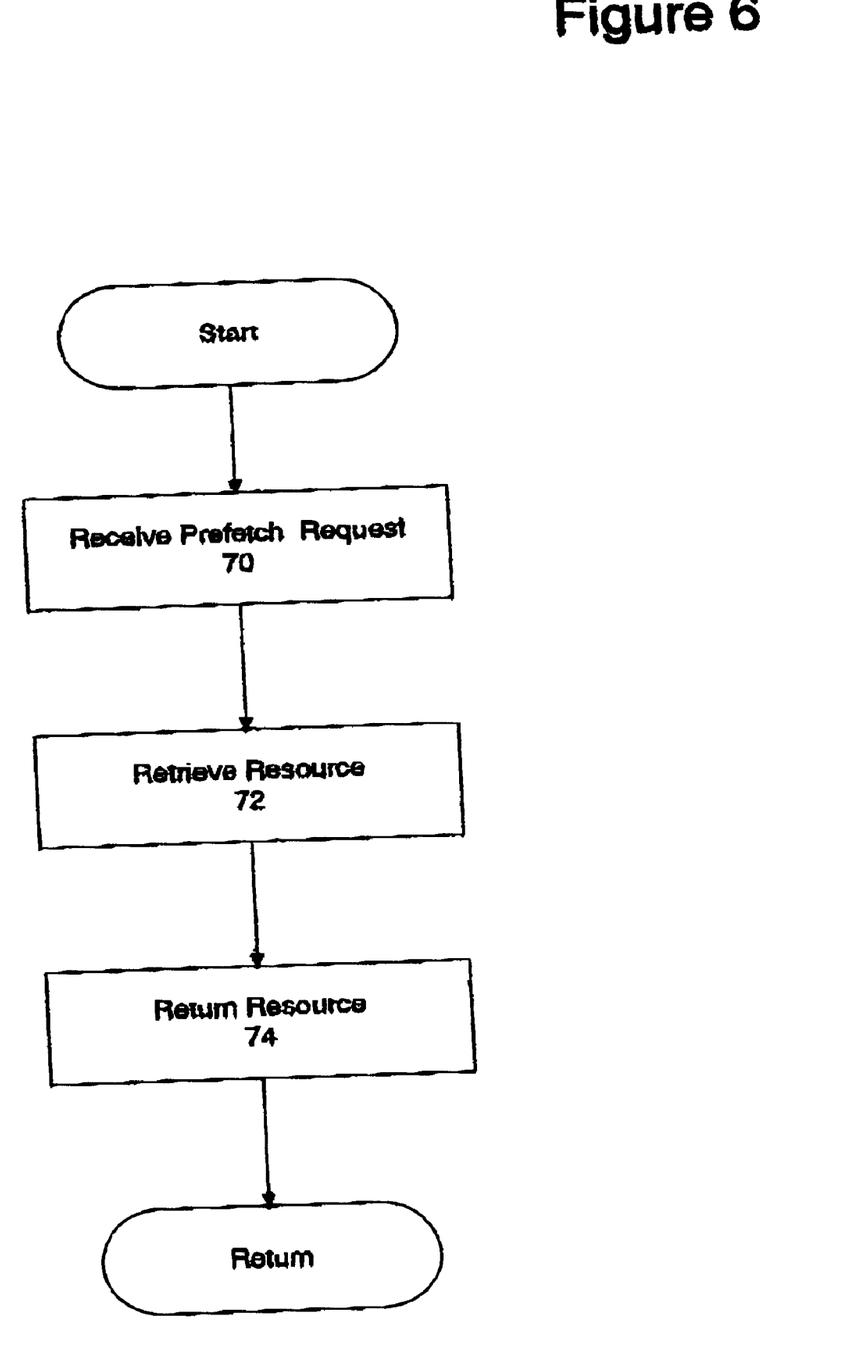
FIG. 6 is a flow chart illustrating the steps that are performed by a device holding a copy of a resource when the resource is to be pre-fetched.

Subsequently, device 10 may submit a resource request 32 that is received as a pre-fetch request by device 12 (step 70 in FIG. 6). In response, the device 12 simply retrieves the resource 24 (step 72 in FIG. 6) and returns a resource to the device 10 (step 74 in FIG. 6).

Figure 7:
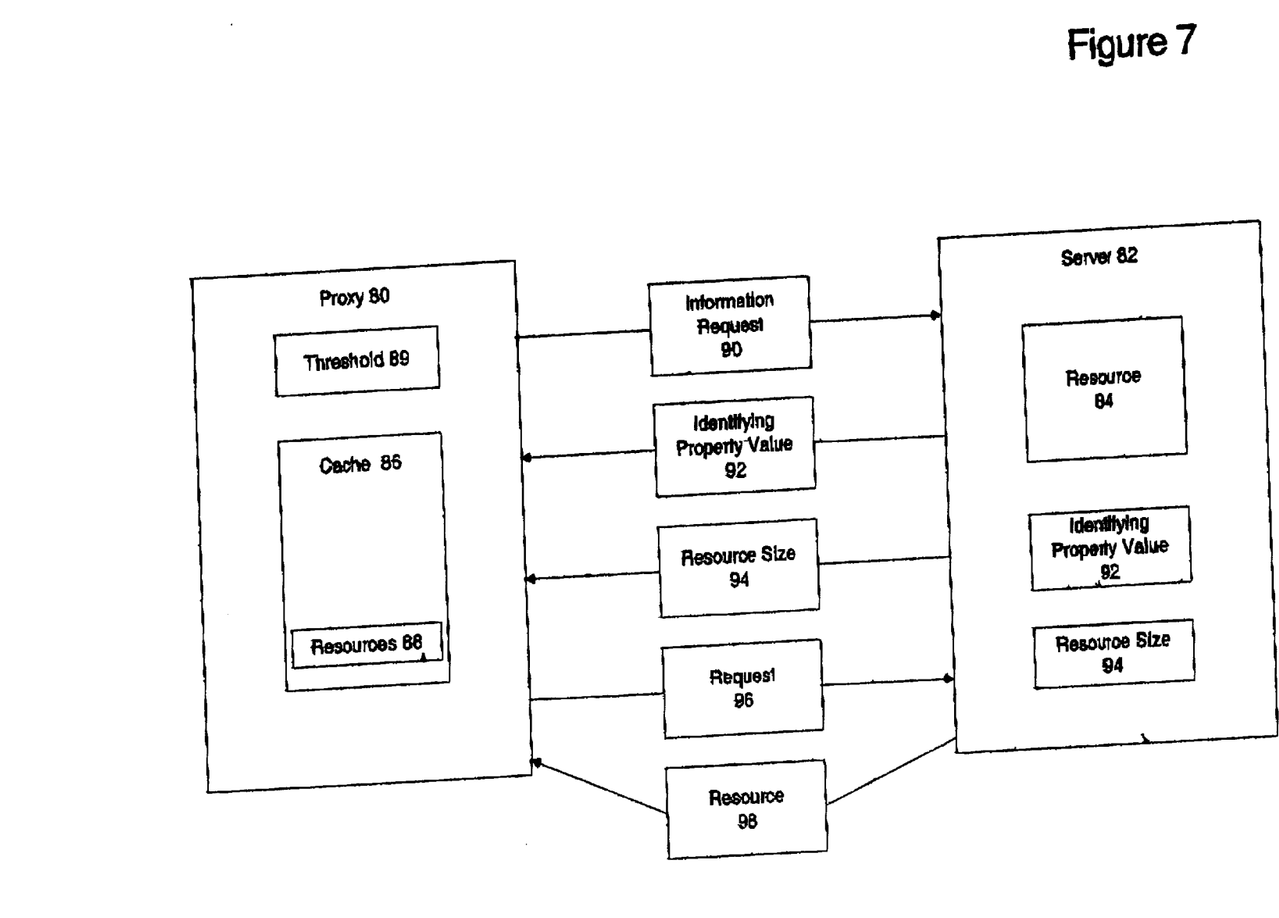
FIG. 7 is a block diagram illustrating communications between a proxy and a server when performing pre-fetching in accordance with the illustrative embodiment.

The above discussion has assumed that the device 10 directly communicates with the device 12. In many instances, a proxy may actually perform the interactions that have been described above relative to the flow charts in FIGS. 3 and 4. FIG. 7 depicts an instance wherein a proxy 80 communicates with a server 82 that holds a copy of a resource 84. The server 82 also holds an identifying property value 92 for the resource, and holds information 94 regarding the resource size. The proxy 80 holds a cache 86. The cache is resources 88. Threshold information 89 may be stored on the proxy 80. The protocol described above relative to FIGS. 3 and 4 may be applied in the case where a proxy is used. Specifically, information request 90 is submitted to the server 82 which returns the identifying property value 92 and the resource size information 94. If the proxy 80 determines that it is desirable to pre-fetch the resource 84, the proxy submits a request 96 and the server 82 returns the resource 98 for storage within the cache 86. The proxy 80 may be shared by multiple users.

While the present invention has been described with reference to an illustrative embodiment thereof, those skilled in the art will appreciate that various changes in form and detail may be made without departing from the intended scope of the present invention as defined in the appended claims.

What is claimed is:

1. In an electronic device having a cache for caching resources, a method comprising the steps of:

obtaining a selected identifying property value for a selected resource, wherein the selected identifying property is intrinsically tied to contents of the selected resource such that if the contents change, the selected identifying property value changes;

comparing the selected identifying property value with identifying property values for the resources in the cache to determine whether the selected resource is resident in the cache; and     where it is determined that the selected resource is not resident in the cache, pre-fetching the selected resource to obtain and store in the cache the selected resource.

2. The method of claim 1, comprising the further steps of:
  determining said selected resource is resident in said cache; and
  not pre-fetching the selected resource as a result of determining said selected resource is resident in said cache.

3. The method of claim 1 wherein the selected resource comprises a web page.

4. The method of claim 3 wherein the selected identifying property value is a hash function value calculated by applying a hash function to at least a portion of the selected resource.

5. The method of claim 1 wherein the selected identifying property value is a hash function value calculated by applying a hash function to at least a portion of the selected resource.

6. The method of claim 1 wherein the method is performed by a proxy.

7. The method of claim 1 wherein the computer system includes a web browser and wherein the method is performed by the web browser.

8. In an electronic device having a cache for caching resources, a medium holding computer-executable instructions for performing a method, said method comprising the steps of:
  obtaining a selected identifying property value for a selected resource, wherein the selected identifying property is intrinsically tied to contents of the selected resource such that if the contents change, the selected identifying property value changes;
  comparing the selected identifying property value with identifying property values for the resources in the cache to determine whether the selected resource is resident in the cache; and
  where it is determined that the selected resource is not resident in the cache, pre-fetching the selected resource to obtain and store in the cache a copy of the selected resource.

9. The medium of claim 8, wherein said method comprises the further steps of:
  determining said selected resource is resident in said cache; and
  not pre-fetching the selected resource as a result of determining said selected resource is resident in said cache.

10. The medium of claim 8 wherein the selected resource is a web page.

11. The medium of claim 8 wherein the selected identifying property values is a hash function value calculated by applying a hash function to at least a portion of the selected resource.

12. In a device having a cache for caching resources, a method, comprising the steps of:
  requesting information regarding a selected resource;
  receiving an identifying property value for the selected resource and information regarding a size of the selected resource; and
  not pre-fetching the selected resource where the size of the selected resource fails to exceed a threshold.

13. The method of claim 12 wherein the method further comprises, where the size of the selected resource exceeds the threshold, using the identifying property value to determine whether the selected resource is already resident in the cache.

14. The method of claim 13, comprising the further steps of:
  determining said selected resource is resident in said cache; and
  not pre-fetching the selected resource as a result of determining said selected resource is resident in said cache.

15. The method of claim 12 where the method further comprises, when it is determined that the selected resource is not already resident in the cache, initiating pre-fetching of the selected resource.

16. The method of claim 12 wherein the selected resource is a web page.

17. The method of claim 12 wherein the identifying property value is a hash function value obtained by applying a hash function to contents of the selected resource.

18. In a device having a cache for caching resources, a medium holding instructions for performing a method, comprising:
  requesting information regarding a selected resource;
  receiving an identifying property value for the selected resource and information regarding a size of the selected resource; and
  not pre-fetching the selected resource where the size of the selected resource fails to exceed a threshold.

19. The medium of claim 18 wherein the method further comprises, using the identifying property value to determine whether the selected resource is already resident in the cache.

20. The medium of claim 18 wherein said method further comprises the steps of:
  determining said selected resource is resident in said cache; and
  not pre-fetching the selected resource as a result of determining said selected resource is resident in said cache.

21. The medium of claim 18 wherein the method further comprises, when it is determined that the selected resource is not already resident in the cache, initiating pre-fetching of the selected resource.

22. The medium of claim 18 wherein the selected resource is a web page.

23. The medium of claim 18 wherein the identifying property value is a hash function value obtained by applying a hash function to contents of the selected resource.

24. In a device having a cache for caching resources, a method comprising:
  obtaining a selected value that is intrinsically tied to contents of a selected resource so as to identify the resource;
  based on the selected value, determining whether the selected resource is already resident in the cache;
  where it is determined that the selected resource is not already resident in the cache, checking whether an additional criteria is met;
  if the additional criteria is met and it is determined that the selected resource is not already resident in the cache, pre-fetching the selected resource.

25. The method of claim 24 wherein the additional criteria is that the resource is of a size that is large enough to warrant pre-fetching.

26. The method of claim 24 wherein the pre-fetching entails requesting the selected resource from a remote device.

27. The method of claim 24 wherein the resource is a web page.

28. The method of claim 24 wherein the selected value is a hash value.

29. In a device having a cache for caching resources, a medium holding computer-executable instructions for performing a method, said method comprising the steps of:

obtaining a selected value that is intrinsically tied to contents of a selected resource so as to identify the resource;

based on the selected value, determining whether the selected resource is already resident in the cache;

where it is determined that the selected resource is not already resident in the cache, checking whether an additional criteria is met;

if the additional criteria is met and it is determined that the selected resource is not already resident in the cache, pre-fetching the selected resource.

30. The medium of claim 29 wherein the additional criteria is that the resource is of a size that is large enough to warrant pre-fetching.

31. The medium of claim 29 wherein the resource is a web page.

32. The medium of claim 29 wherein the selected value is a hash value.

* * * * *